Oct. 3, 1939.   R. S. QUICK ET AL   2,174,598
ENERGY ABSORBER
Filed March 13, 1937    4 Sheets-Sheet 1
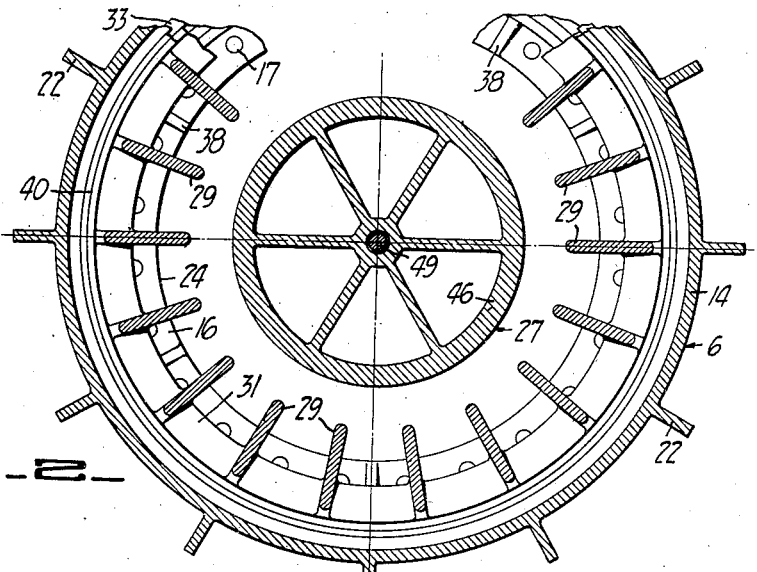
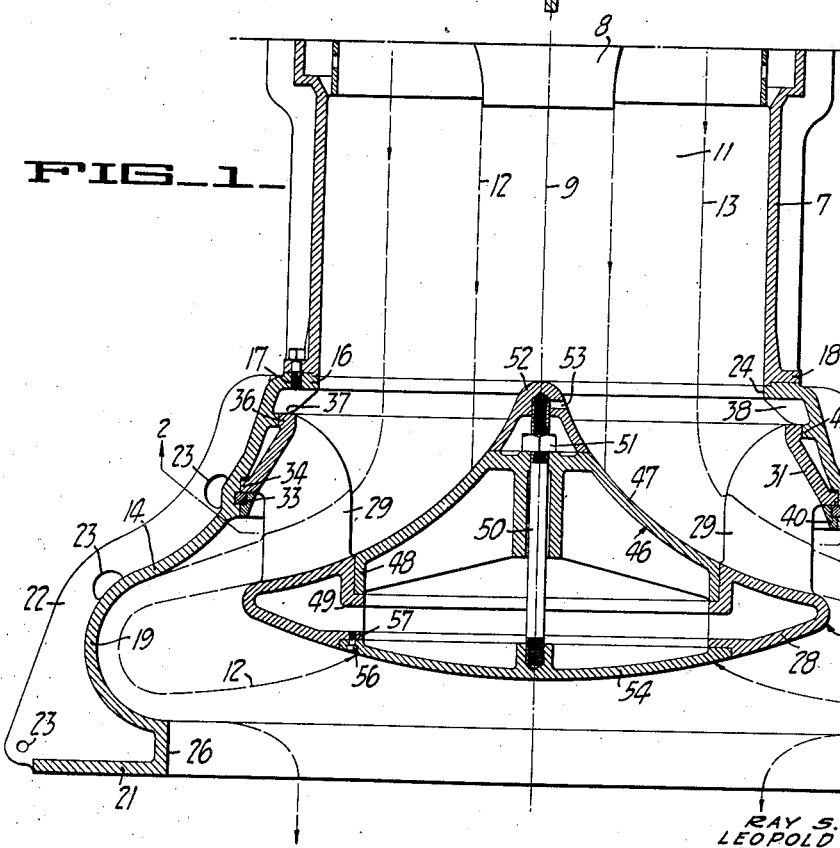
INVENTORS
RAY S. QUICK
LEOPOLD M. KARNASCH
EVERETT M. BREED
BY Marcus Lothrop
ATTORNEY.

Oct. 3, 1939.    R. S. QUICK ET AL    2,174,598
ENERGY ABSORBER
Filed March 13, 1937    4 Sheets-Sheet 2
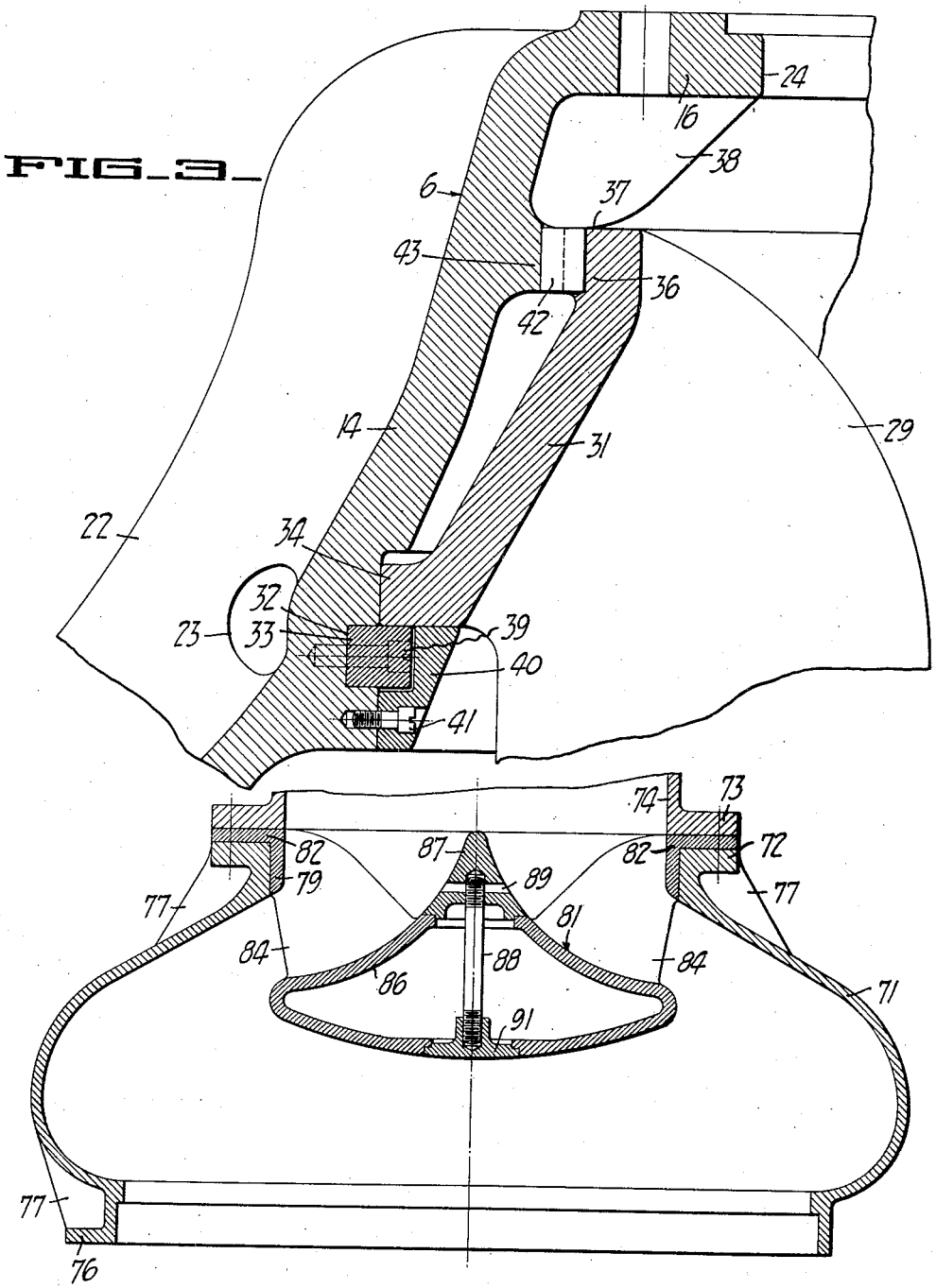
INVENTORS
RAY S. QUICK
LEOPOLD M. KARNASCH
BY EVERETT M. BREED
Marcus Lothrop
ATTORNEY.

Oct. 3, 1939.   R. S. QUICK ET AL   2,174,598
ENERGY ABSORBER
Filed March 13, 1937   4 Sheets-Sheet 3
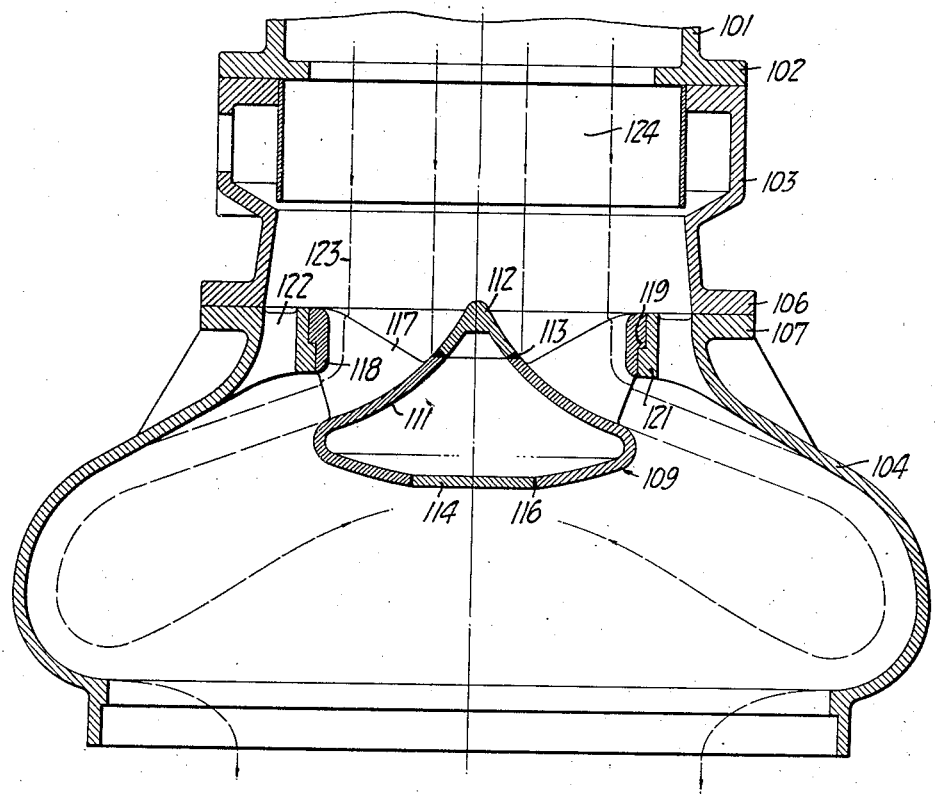
FIG_5_
INVENTORS
RAY S. QUICK
LEOPOLD M. KARNASCH
EVERETT M. BREED
BY Marcus Lothrop
ATTORNEY.

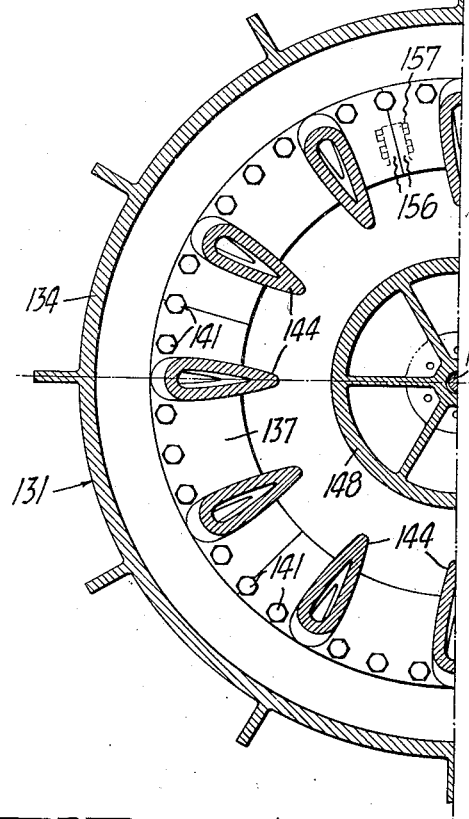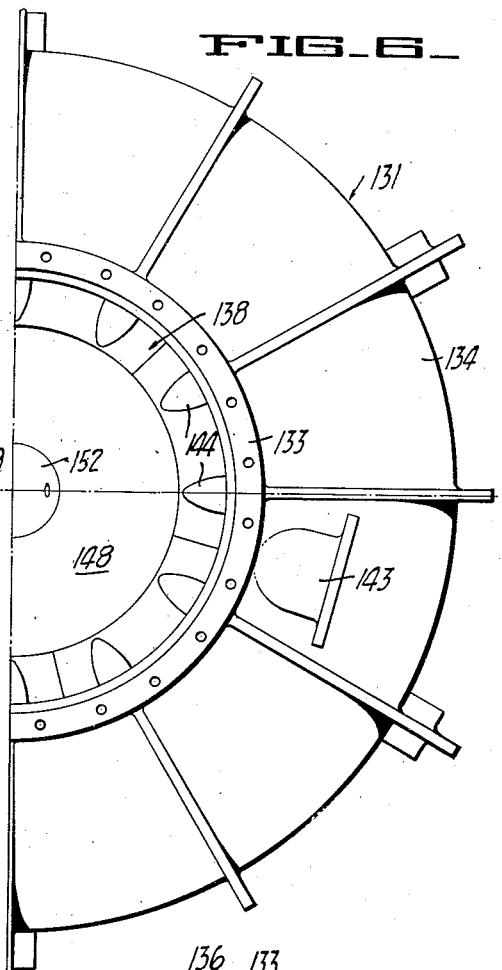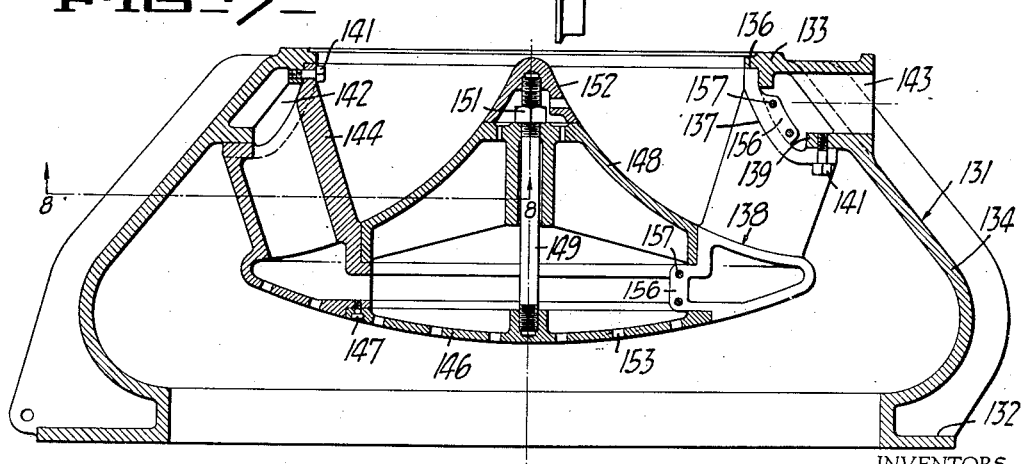

Patented Oct. 3, 1939

2,174,598

UNITED STATES PATENT OFFICE 2,174,598

ENERGY ABSORBER

Ray S. Quick, Burlingame, Leopold M. Karnasch, San Francisco, and Everett M. Breed, San Mateo, Calif., assignors to The Pelton Water Wheel Company, San Francisco, Calif., a corporation of California Application March 13, 1937, Serial No. 130,744

4 Claims. (Cl. 138—37)

The invention relates to hydraulic energy absorbers of the general type disclosed in Patent No. 1,539,256, issued May 26, 1925, to Frederick Gfeller, and is concerned particularly with energy absorbers for similar use in hydraulic systems wherein it is desirable to reduce the kinetic energy of the liquid from an amount which is destructive or dangerous to a lower value which can be safely and economically dealt with. Typical environments for energy absorbers are the outlets of valves, pressure regulators, water wheels, turbines and comparable hydraulic conduits, particularly when such units are very large.

It is an object of our invention to provide an energy absorber which is readily fabricated by ordinary manufacturing yet is of relatively great size.

Another object of our invention is to provide an energy absorber which can easily be repaired and maintained after initial fabrication and after installation.

A further object of our invention is to provide an energy absorber having a high efficiency.

An additional object of the invention is to provide an energy absorber in which the cost of manufacture and maintenance is relatively low.

A further object of the invention is to provide an energy absorber in which cavitation and sudden pressure surges are precluded.

The foregoing and other objects are attained in the embodiments of the invention disclosed in the drawings, in which—

Fig. 1 is a cross-section on an axial plane of an energy absorber constructed and installed in accordance with our invention.

Fig. 2 is a cross-section the planes of which are indicated by the lines 2—2 of Fig. 1, a portion of the figure being broken away to reduce its size.

Fig. 3 is an enlarged detail of the contacting portions of the shell and deflector.

Fig. 4 is a cross-section on an axial plane showing a modified form of energy absorber of our invention.

Fig. 5 is a cross-section on an axial plane showing a further modified form of energy absorber in accordance with our invention.

Fig. 6 is a half plan of another modified form of energy absorber in accordance with our invention.

Fig. 7 is a cross-section on an axial plane of the form of energy absorber shown in Fig. 6.

Fig. 8 is a half cross-section the plane of which is indicated by the line 8—8 of Fig. 7.

Although the energy absorber designed in accordance with our invention and disclosed herein is susceptible of embodiment in many different forms and for various different environments and installations, and can quite readily be utilized in a complete range of sizes, there is especial emphasis upon the advantages of the invention for energy absorbers of relatively large size. As an example, the absorber disclosed in Figs. 1, 2 and 3 is in one embodiment somewhat in excess of 12 feet in maximum diameter and is designed to operate at about 420 feet hydraulic head, with an entering velocity of about 164 feet per second and an exit velocity of about 25 feet per second, the maximum quantity of water handled being about 1920 second feet, and the equivalent horse power being approximately 92,000. Under maximum conditions the axial thrust tending to dislodge the deflector is about 620,000 lbs. An energy absorber of this size and capacity must be very carefully designed, not only with respect to the feasibility of manufacture, but likewise with respect to the difficulty of shipment from the point of manufacture to the point of installation, the difficulty of installation for permanent operation, and the facility of repair and maintenance after a permanent installation has been effected. A further factor is to provide a design consistent with all of these requirements which still is hydraulically satisfactory. These various attributes are possessed by the structures shown herein.

As particularly disclosed in Figs. 1, 2 and 3, the energy absorber 6 of our invention is designed to be attached to the outlet conduit 7 of a hydraulic valve. The valve is represented by a needle 8, located coincident with the axis 9 of the conduit 7, and is preferably contoured to formulate a jet 11 of water which may be a solid stream but in the present instance is defined by inner and outer envelopes represented by lines 12 and 13, indicating that the jet is a hollow column of annular cross-section. The purpose of the energy absorber is to divert this jet and so to control it as to result in a reduction in the velocity of flow.

To this end the energy absorber 6 comprises an outer shell 14, preferably fabricated of cast steel. Because of the large size of the unit, it is difficult to make such a casting, yet by making the walls thereof of substantially uniform thickness throughout, successful castings can be made. The shell 14 is at one end terminated by an attaching flange 16 receiving fastenings 17 engaging a corresponding flange 18 on the conduit 7, and securing the shell in place. From the flange 16 the shell gradually flares radially outward and merges with a somewhat toroidal portion 19 converging into and terminating in a discharge flange 21. For strengthening the shell 14, on the exterior thereof there is a plurality of radial ribs 22 extending between the flanges 16 and 21 and at various points having apertures 23 therein for facilitating manufacture, handling and installation. The described shell forms a continuation of the conduit 7, having an especially contoured configuration, and defines an upstream inlet aperture 24 and a downstream outlet aperture 26. The shell 14 itself, being completely open in its interior and having substantially uniform walls, can be successfully cast with economy even though very large in size, and is capable of minute inspection for flaws and of careful finishing for smoothness of hydraulic flow and therefore increased efficiency.

In order to divert the flowing jet 11, we preferably provide within the shell 14 a deflector, generally designated 27. The deflector is a hollow body, substantially symmetrical about the axis 9, and is located coaxially with the shell 14. Preferably, the major portion of the deflector is, for cheapness and facility of manufacture, constructed of cast steel, and we therefore provide the deflector with a substantially annular body 28 from which extends a plurality of axial and radial arms 29, preferably cast integrally with the body 28 and terminating in a ring 31. This ring can be a continuous band, as illustrated in the drawings, or can be peripherally interrupted, if desired, for facilitating the casting operation. Under all circumstances the various walls of the ring 31 and of the body 28, as well as the arms 29, are made of substantially uniform thickness so that casting is facilitated and deleterious strains are obviated.

In order to seat the ring 31 in the shell 14, we provide suitable fastening means which are located out of the path of the hydraulic stream 11, in a space within the shell unfilled by the flowing hydraulic column. In this way, major interruptions to the flow and deleterious turbulence are avoided, and freedom to design and provide adequate fastening means is gained. For this reason the shell 14 is provided with an internal groove or channel 32, into which a plurality of separate locking segments 33 are fitted. The segments 33 abut against a lower flange 34 on the ring 31 and force an upper peripheral flange 36 on the ring 31 into abutment with each of a plurality of seats 37 on radially arranged ribs 38 within the shell 14. The ring 31 is therefore accurately seated within the shell 14 and is clamped in place by the locking segments 33. These segments themselves are held in place by studs 39 extending radially outward to engage the shell 14, and are further protected by guard segments 40 which in turn are held in the shell by fastening studs 41.

As a further means for detachably securing the deflector within the shell we provide a plurality of dowel pins 42 partially engaging the upper flange 36 and partially engaging a corresponding flange 43 projecting inwardly from the shell 14. The dowels are primarily for the purpose of precluding any rotation of the deflector within the shell since, under certain circumstances and with certain types of valve 8, the water jet 11 has a rotary component causing a helical flow which is effective upon the arms 29 to impose a torque on the deflector. While in many cases the frictional fit or clamping action between the removable deflector and the shell is adequate to resist any such torque, it is often advisable to provide a supplementary fastening, such as the dowels 42.

In the fabrication of the deflector 27 itself, and in view of the wear on the upstream surface thereof due to impingement thereagainst of the hollow jet 11, we complement the annulus 28 by an upstream cone 46 the outer surface 47 of which is preferably faced with a hard, wear-resistant material. The cone 46 itself is easily replaceable when worn, since it is held with a peripheral flange 48 abutting a complementary flange seat 49 on the annulus 28 by a central bolt 50 and nut 51. The fastening is located in the hollow center of the jet 11, so that it is not subject to hydraulic stresses, and is additionally protected by a cap 52 of conical form which threadedly engages the bolt 50 and is provided with sockets 53 for a wrench bar. The bolt 50 is positioned by engagement with a downstream wear plate 54 which follows the general contour of the annulus 28 and completes the closure of the hollow deflector. The wear plate 54 is peripherally flanged to receive fastening studs 56 in engagement with a flange seat 57 on the annulus 28. The path of water flow or the internal envelope 12 of the discharging stream is such that the discharging water impinges upon the wear plate 54 itself and not upon the annulus 28. Wear upon the deflector is virtually non-existent except where replaceable wearing parts, such as the cone 47 and the plate 54, are situated for ready replacement.

In the arrangement shown in Fig. 4, the structure is particularly designed so that the deflector can be removed from the shell through the inlet thereof. In this embodiment the outer shell 71 is provided with an inlet flange 72 bounding an inlet opening and is designed for co-operation with a flange 73 on a hydraulic conduit 74 the characteristics of which are substantially the same as those of the conduit 7 in Fig. 1. The shell 71 has walls of substantially uniform thickness extending to an outlet flange 76 which encompasses the outlet opening of the shell. Reinforcing ribs 77 extend between the body of the shell and the outlet flange 76 and between the body of the shell and the inlet flange 72. The general contour of the shell and its fabrication of cast steel are virtually the same as described in connection with the structure of Figs. 1 to 3.

Adapted to be supported within the inlet opening of the shell is a ring 79 forming part of a deflector generally designated 81. The ring 79 is preferably of substantially uniform thickness of cast steel and terminates in a broad flange 82 clamped between the flanges 72 and 73. The usual fastening means between the flange 72 and the flange 73 effect this clamping action, and, since they also pass through the flange 82, the fastening means also preclude any possibility of rotation of the deflector 81 within the shell 71. Extending axially and radially from the ring 79 are arms 84 joining the annular deflector body 86 and preferably cast integrally therewith.

To complete the closure of the hollow deflector, the annulus 81 is contoured to receive a conical cap nut 87 which follows the contour of the surface of the body 86 and engages a bolt 88 extending axially therethrough. Passages 89 in the cone 87 are adapted to receive wrench bars for assembling the cone 87 on the bolt 88. The bolt itself is positioned by engagement with a lower cover plate 91 which is seated upon the downstream face of the annular body 86 and completes the closure of the deflector.

In this arrangement the outer diameter of the deflector body 86 is slightly less than the outer diameter of the ring 79, so that, when the flange 73 and the conduit 74 are removed, the entire deflector assembly 81 can be withdrawn from the shell 71 through the inlet opening thereof for complete replacement or repair. This likewise facilitates access to the interior of the shell 71 for inspection and repair, access being gained entirely from the inlet side. Further, if the entire deflector is not to be repaired, the bottom cover plate 91 and the central cone 87 can readily be replaced if desired.

In the modification shown in Fig. 5, the design is similar to that of the devices in the preceding figures but has certain special characteristics. In this embodiment the hydraulic conduit 101, which may be the outer housing of a relief valve, terminates in a flange 102 to which is secured an intermediate adapter section 103 which amounts to a spacing conduit. Ordinarily, the conduit 101 may be removable only with difficulty, and the shell 104 of the energy absorber may likewise be removable with difficulty since customarily the shell is embedded in concrete. Preferably, however, the adapter section 103 is not so embedded, and, by removing the fastenings which secure the flange 102 to the adapter 103, and also the fastenings which secure the lower flange 106 of the adapter to the inlet flange 107 of the shell 104, it is possible to remove the adapter section transversely, leaving an access space between the conduit 101 and the shell 104. This space is preferably of appropriate dimensions to permit the passage, axially and laterally, of the deflector 109 which, when installed, is disposed coaxially with the shell 104.

The deflector preferably comprises an annular body 111 suitably fabricated and closed by an upstream, central cone 112 which is connected to the body by welding 113, and a downstream closure plate 114 which also is connected to the body 111 by welding 116. Extending from the annular hollow body 111 are radial and axial arms 117 terminating in a ring 118 which is provided with a step 119 seating within a corresponding step ring 121 joined to the shell 104 by a plurality of radial arms 122. Preferably, the rings 121 and 118 are located outside of the outer envelope 123 of the hydraulic jet 124 so that they in no wise interfere with the smoothness of hydraulic flow through the structure. When the adapter section 103 is removed, the deflector 109 can be passed through the inlet opening of the shell 104 into the space left by removal of the adapter section 103 and can then be entirely removed transversely of the conduit 101 and the shell 104 for replacement or repair. In some installations it is not feasible to remove the spacing conduit 103, but the deflector 109, and especially the ring 118, are of sufficiently small diameter that the deflector can be passed axially through the spacing conduit and into the conduit 101. In instances wherein the conduit 101 is the housing of a valve, the interior mechanism of the valve first is removed to allow axial passage of the deflector through the conduit 101 for inspection and repair.

As disclosed in Figs. 6 to 8, inclusive, there is provided an energy absorber in which the outer shell 131 is similar to that shown in Fig. 1 and includes attaching flanges 132 and 133 and an interposed, somewhat toroidal portion 134. Beneath the attaching flange 133 there is provided a circular seat 136 for a ring 137 included in a deflector 138 located coaxially within the shell 131. A circular internal flange 139 integral with the shell also serves as an abutment for the ring 137, which is held against the shell 131 by suitable fastenings, such as studs 141.

The ring 137 and the shell between the flange 139 and the seat 136 together define an annular conduit 142 communicating with the exterior through a duct 143 and serving as a manifold for hollow arms 144 supporting the hollow deflector body 138. The deflector is completed by a lower wear plate 146, held in place by studs 147, and an upper wear cone 148 held by a stay 149 engaging the lower plate 146 and provided with a nut 151 abutting the cone 148. A cap 152 also engages the stay and provides a smooth terminus for the cone 148.

As a special attribute of this design, the deflector body 138 on its lower face, and the wear plate 146, are provided with a plurality of apertures 153 establishing communication between the interior of the deflector 138 and the interior of the shell 131. In operation, the flow of water through the energy absorber induces the flow of air into the duct 143, through the conduit 142 and the arms 144 to the body 138, from whence the air discharges through the apertures 153 to mix with and become entrained with the flowing water. This admixture of air prevents or destroys areas of high vacuum within the conduit which would cause cavitation accompanied by heavy pounding and severe pressure surges.

This design also illustrates a feature of construction which can be applied to the other embodiments, in that a major part of the deflector is sectionalized so that it can be assembled and disassembled within the shell 131 and removed through either opening. Preferably, the ring 137 and related members are parted in several places, for instance six places defined by equidistant radial planes. The separate parts are provided with appropriate fastening flanges 156 and securing devices 157.

We claim:
1. An energy absorber comprising a shell, a deflector within said shell and together therewith providing a tortuous hydraulic path, means for directing hydraulic fluid flowing in said path to fill only part of said shell, and means in an unfilled part of said shell for removably attaching said deflector to said shell.

2. An energy absorber comprising a shell for confining the flow of hydraulic fluid, a hollow deflector within said shell, and means for admitting air to the interior of said shell through said deflector.

3. An energy absorber comprising a shell for confining the flow of hydraulic fluid, a deflector within said shell, and means for releasing air into said shell adjacent the lower face of said deflector.

4. An energy absorber comprising a hydraulic conduit, an enlarged shell coaxial with said conduit and contoured to provide a radially inward hydraulic flow, a deflector disposed coaxially within said shell, and means arranged concentrically within said shell and out of said hydraulic flow for detachably securing said deflector thereto.

RAY S. QUICK.
LEOPOLD M. KARNASCH.
EVERETT M. BREED.